US006941780B1

(12) United States Patent
Marr

(10) Patent No.: US 6,941,780 B1
(45) Date of Patent: Sep. 13, 2005

(54) TRAILER WHEEL LOCK SYSTEM

(76) Inventor: Kendall Joe Marr, 8083 NW. 23rd St., Oklahoma City, OK (US) 73127

(*) Notice: Subject to any disclaimer, the term of this patent is extended or adjusted under 35 U.S.C. 154(b) by 0 days.

(21) Appl. No.: 10/961,278

(22) Filed: Oct. 8, 2004

Related U.S. Application Data

(63) Continuation-in-part of application No. 10/845,975, filed on May 14, 2004.

(51) Int. Cl.[7] ............................................. B60R 25/00
(52) U.S. Cl. ............................. 70/226; 70/14; 70/238; 280/507; 188/32; 410/3
(58) Field of Search . 280/507; 180/287; 414/481–485; 188/31, 32, 67, 69; 248/499; 24/265 CD, 24/115 K; 410/3, 4, 6, 7, 9–11, 16, 19–23, 410/49, 50, 101; 70/209–212, 259, 54–56, 70/14, 18, 19, 225–227, 237, 238, 416, 417, 70/201, 203

(56) References Cited

U.S. PATENT DOCUMENTS

| 977,533 | A | * | 12/1910 | Myers | 70/182 |
|---|---|---|---|---|---|
| 1,307,161 | A | * | 6/1919 | Stubblefield | 70/226 |
| 1,333,878 | A | * | 3/1920 | Smith | 70/253 |
| 1,401,971 | A | * | 1/1922 | Faison | 70/15 |
| 1,426,534 | A | * | 8/1922 | Baker | 70/253 |
| 1,464,262 | A | * | 8/1923 | Fish | 70/226 |
| 1,504,220 | A | * | 8/1924 | Degen | 70/227 |
| 2,135,857 | A | * | 11/1938 | Stahl | 414/494 |
| 2,980,522 | A | * | 4/1961 | Dille et al. | 48/198.3 |
| 3,711,117 | A | * | 1/1973 | Penner et al. | 280/762 |
| 3,713,668 | A | * | 1/1973 | Flindt | 280/762 |
| 3,729,778 | A | * | 5/1973 | McGrath | 248/117.7 |
| 4,488,417 | A | * | 12/1984 | Werner | 70/253 |
| 4,538,435 | A | * | 9/1985 | Romero | 70/183 |
| 4,794,771 | A | | 1/1989 | Princell | |
| 5,463,885 | A | * | 11/1995 | Warren, Sr. | 70/18 |
| 5,475,995 | A | * | 12/1995 | Livingston | 70/259 |
| 5,638,710 | A | * | 6/1997 | Howard et al. | 70/259 |
| 5,689,981 | A | | 11/1997 | DeLuca | |
| 5,724,839 | A | * | 3/1998 | Thering | 70/18 |
| D396,627 | S | | 8/1998 | Blad | |
| 5,956,983 | A | | 9/1999 | Hughes | |
| D440,859 | S | | 4/2001 | Denman | |
| 6,427,498 | B1 | * | 8/2002 | Cobb | 70/56 |
| 6,532,780 | B1 | * | 3/2003 | Frantz | 70/225 |
| 6,619,708 | B1 | * | 9/2003 | Naylor | 292/259 R |
| 6,796,154 | B2 | * | 9/2004 | Gebow et al. | 70/226 |
| 6,829,914 | B2 | * | 12/2004 | Bullock | 70/14 |

* cited by examiner

Primary Examiner—Suzanne Dino Barrett
(74) Attorney, Agent, or Firm—Randal D. Homburg

(57) ABSTRACT

A wheel lock system for an at least two wheeled trailer with an object or a personal water craft, the trailer having leaf springs, the wheel lock system including two hook shaped members which attach to each of the leaf springs and protrude through slotted holes in the wheels and is locked into position and retained in position by respective locks engaging one of a plurality of upper grooved indentations on each hook shaped member, a locking member slidably engaged between the hook shaped members placed upon the crook shaped member prior to application of the lock to protect the wheel from damage when removing and engaging the wheel lock device, and a chain connecting between the two hook shaped members attached to the wheels with a vertical shaft locking member engaging an impeller shaft on the small personal water craft, securing the personal water craft to the trailer.

8 Claims, 5 Drawing Sheets

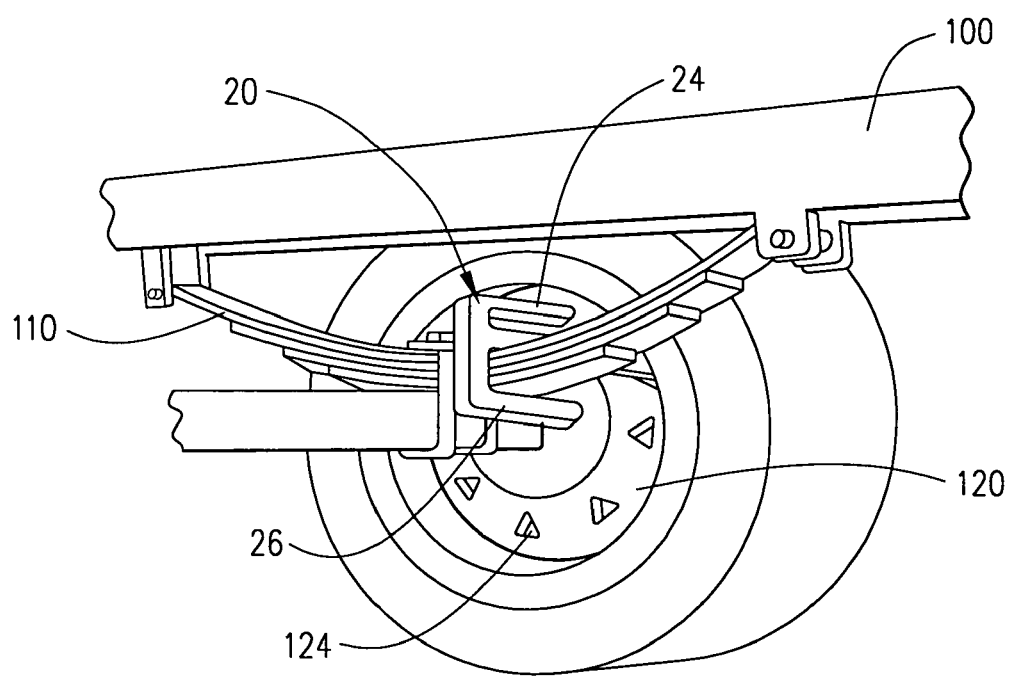
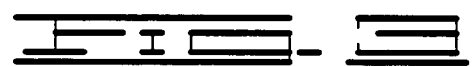
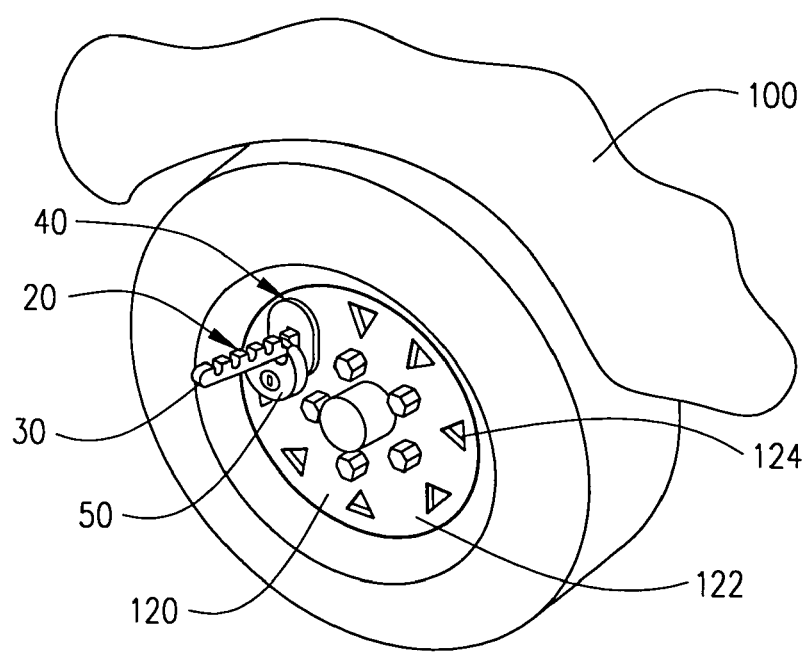
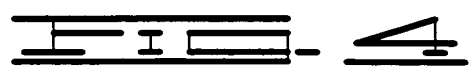

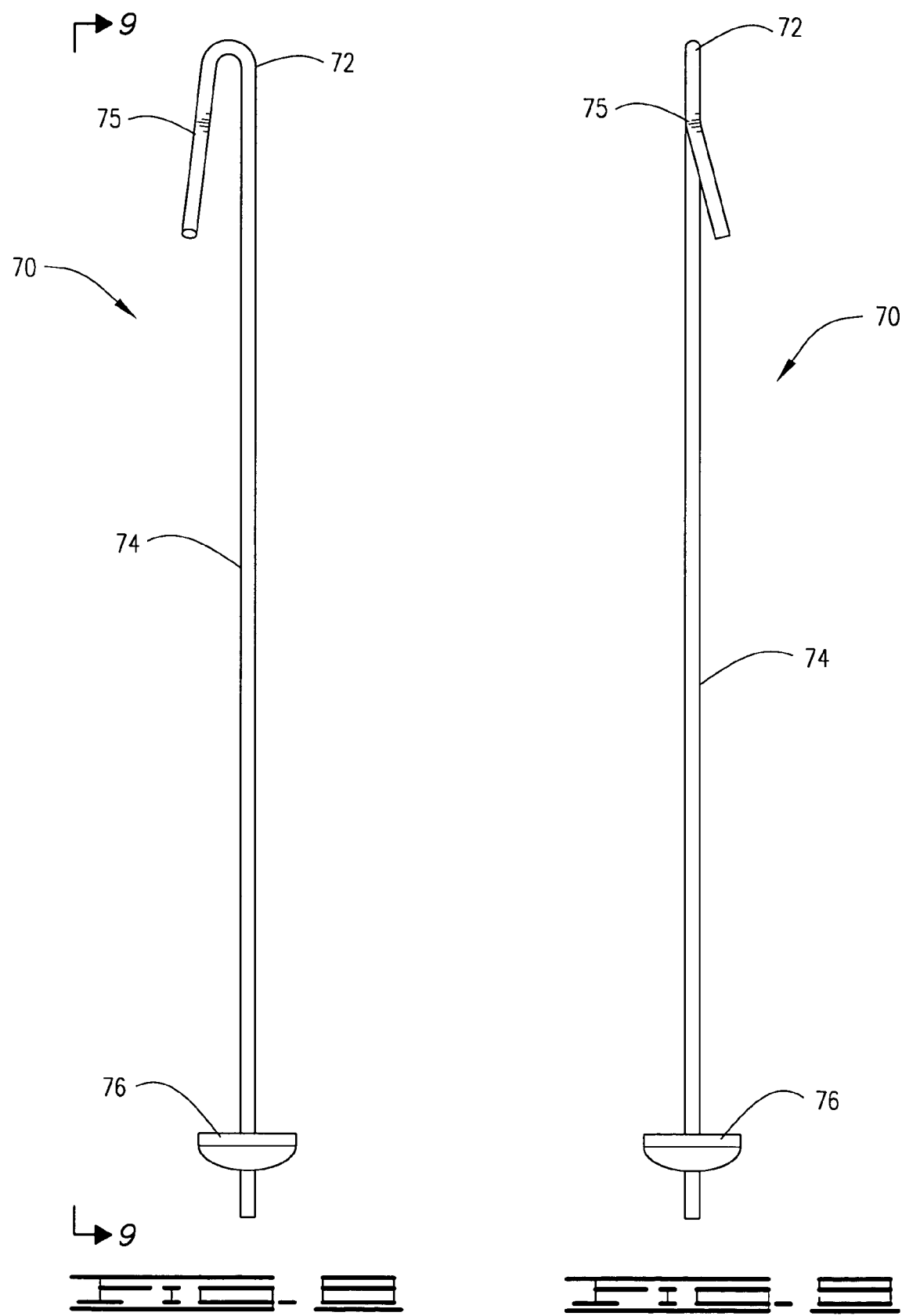

TRAILER WHEEL LOCK SYSTEM

CROSS REFERENCE TO RELATED APPLICATIONS

This application is a Continuation-in-Part of application Ser. No. 10/845,975 filed on May 14, 2004.

I. BACKGROUND OF THE INVENTION

1. Field of Invention

A wheel lock system for an at least two wheeled trailer with a small personal water craft, the trailer having leaf springs, the wheel lock system including two hook shaped members which attach to each of the leaf springs and protrude through slotted holes in the wheels and is locked into position and retained in position by respective locks engaging one of a plurality of upper grooved indentations on each hook shaped member, a locking member slidably engaged between the hook shaped members placed upon the hook shaped member prior to application of the lock to protect the wheel from damage and to prevent rotation and removal of the wheel, and a chain connected between the two hook shaped members attached to the wheels with a vertical shaft locking member engaging an impeller shaft on the small personal water craft, securing the personal water craft to the trailer.

2. Description of Prior Art

The following United States patents were discovered and are disclosed within this application for utility patent. All relate to lock devices for bicycles, trailers and automobiles.

In U.S. Pat. No. 5,638,710 to Howard, Jr., a method for securing a spare tire is disclosed, defining a J-shaped rod member having a short segment, a curved segment and a long segment, with the curved segment adapted to engage a hoist shaft, and the long segment extending through a lug hole in the wheel with a fastening lock engaging the long segment. This invention, which claims a method, requires the presence of a hoist shaft, an open lug hole in the wheel stored underneath a vehicle, and a specialized lock defined exclusively for use to the invention. The present invention is used on a wheel of a trailer which does not have an open lug hole nor does it have a hoist shaft, securing instead the device between a leaf spring and an open slot in the attached wheel, using any padlock which meets the defined parameters of the stated invention requirements.

In U.S. Pat. No. 5,956,983 to Hughes, a cycle lock includes a similar J-shaped device, or a crook shaped device with a holding bracket that is either pivotal or non-pivotal. It is adapted to secure the front forks and front wheel of a bicycle to a vertical post. Its component parts include the J-shaped locking cane having a straight portion defining a first section with a square cross-section and a second section which is a hooked portion with a holding bracket adapted for attachment to a first arm of a fork of a cycle with a substantially square through-hole for matingly engaging and securing the second section, with a locking bracket adapted to a second arm of a fork of the cycle with a locking means for securing the second section, whereby the locking cane, locking bracket and holding bracket a brought together to secure the cycle to a stationary object. This device requires a stationary object to secure the cycle to, and it also requires two separate pieces which clamp onto two separate items on the cycle, adapted to the cycle forks, which compress together to clamp the forks within the locking device and further secure the cycle to the stationary object.

Other patents noted include U.S. Pat. No. 5,689,981 to DeLuca, U.S. Pat. No. 5,475,995 to Livingston, and U.S. Pat. No. 4,794,771 to Princell.

II. SUMMARY OF THE INVENTION

Several wheel lock devices have been disclosed in prior inventions which have been used to limit the rotation of a wheel on a trailer when applied, thus thwarting a thief who might attempt to steal the trailer. This is most commonly seen when the trailer is unattended while in storage and also while the item carried by the trailer is being used, as would be the case with a water craft or construction equipment. A great number of these grab or engage the outer perimeter of the wheel and tire, using the ground to limit rotation of the wheel. However, these devices are quite costly and heavy and require some time to apply the device, which also requires a large amount of space to transport and store between uses.

The current device is compact and may be stored in a trunk or even a glove box. It is also limited in the number of parts, having only the hook shaped member, a lock, a locking member, a chain and a vertical shaft locking member. It is applied by engaging a chain between the two hook shaped members, inserting the vertical shaft locking member through a selected chain link and then placing the curved hook portion of the vertical shaft locking member over the impeller shaft, inserting the locking ends of the hook shaped members through any slot in the respective trailer wheel, engaging the hook ends of each hook shaped member to a leaf spring of the trailer, sliding the locking member on each of the locking ends against the outer wheel surface, and engaging the locks on the locking ends in the closest upper grooved indentations to the wheel.

The primary objective of the invention is to provide a lock device system preventing rotation and removal of the wheels of a trailer and preventing removal of a personal water craft, the device having two hook shaped members with a hook end engaging leaf springs under the trailer, each hook shaped member further having a locking end protruding through a slot in each trailer wheel and applying a lock to one of a plurality of upper grooved indentations with a chain connected between the two hook shaped member having a vertical shaft locking means engaged with the impeller shaft of a personal water craft to prevent removal of the personal water craft from the trailer.

A second objective is to provide a locking member which slides along the locking end of the hook shaped member and abuts the outer surface of the wheel against which the lock is applied to engage the wheel and to prevent damage to the outer surface.

A third objective is to apply a portion of the system to either lock the personal water craft to the trailer without locking the wheels, lock the personal water craft to the trailer and lock the trailer wheels, or lock the trailer wheels without locking the personal water craft to the trailer.

III. DESCRIPTION OF THE DRAWINGS

The following drawings are submitted with this utility patent application.

FIG. 3 is a view of the trailer and slotted trailer wheel from the underside of the trailer indicating the lower hook of the hook end of the hook shaped member attached to the leaf spring of the trailer.

FIG. 4 is an outside view of the trailer and slotted trailer wheel with the hook shaped member with the locking member and padlock attached.

FIG. 8 is a side view of the vertical shaft locking member.

FIG. 9 is a front view of the vertical shaft locking member along reference lines 9/9 of FIG. 8.

IV. DESCRIPTION OF THE PREFERRED EMBODIMENT

Figure 1:
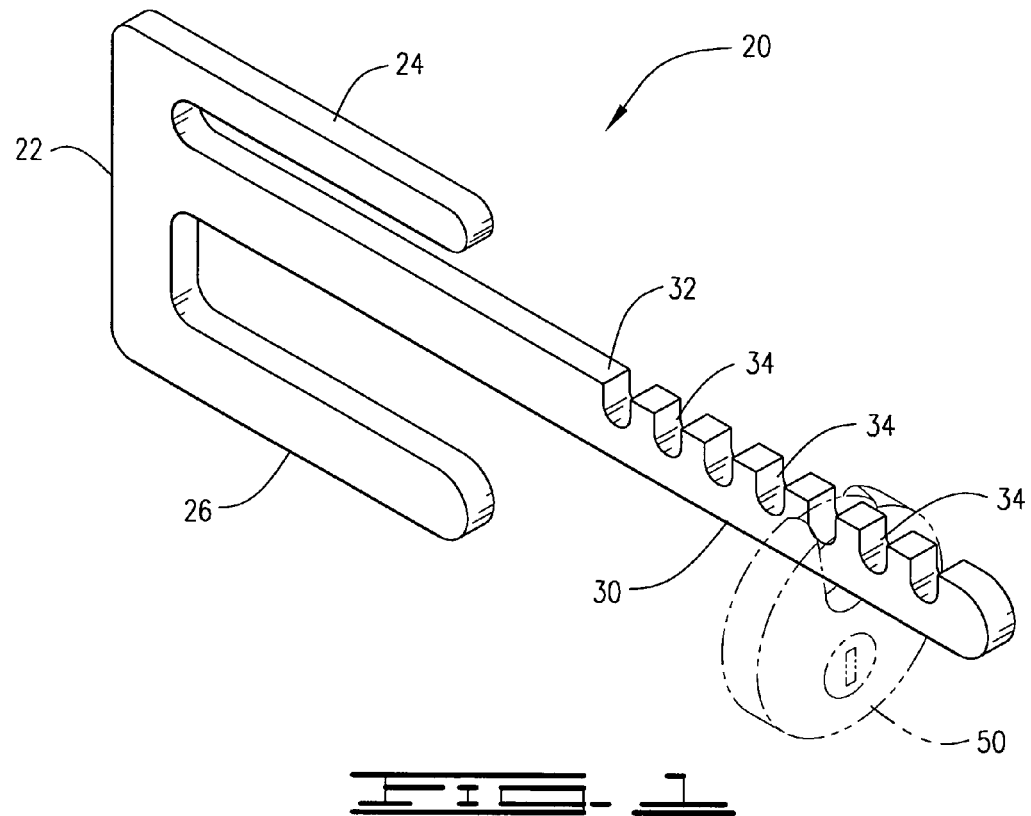
FIG. 1 is a perspective view of the hook shaped member with the locking member and a padlock.
Figure 2:
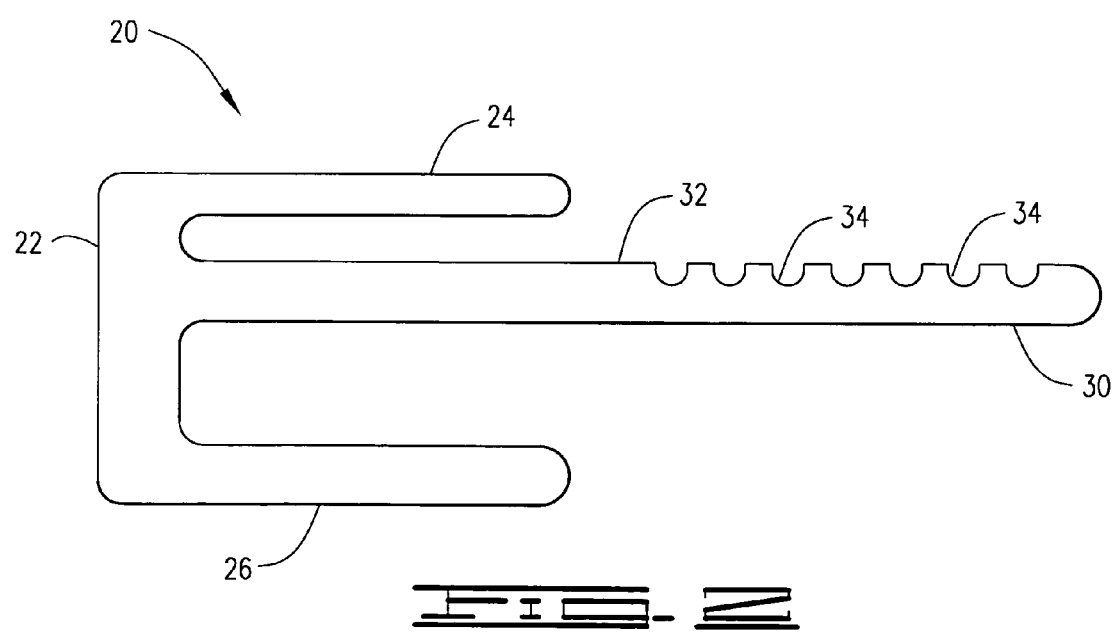
FIG. 2 is a side view of the hook shaped member.

A trailer wheel lock system 10 for a trailer 100 having leaf springs 110 and at least two wheels 120, upon which is carried an object 200, primarily a trailer 100 adapted for carrying a personal water craft 200 having an impeller shaft 210, shown in FIGS. 1–9 of the drawings, intended to secure the trailer 100 and the object 200, comprises a pair of hook shaped members 20, each hook shaped member 20 having a hook end 22 from which depend an upper hook 24 and a lower hook 26, FIGS. 1–2, and a locking end 30 defining an upper surface 32 within which are a plurality of spaced indentations 34 within which is secured a padlock 50, FIGS. 1 and 4, the locking end 30 inserted through a slot 124 in the respective trailer wheel 120 prior to application of the padlock 50, locking members 40 placed along the locking end 30 between each respective padlock 50 and an outer surface 122 of each trailer wheel 120, a chain 60 having a plurality of links 62 attached between the hook ends 22 of each hook shaped member 20, and a vertical shaft locking member 70 inserted through a link 62 of the chain 60, the vertical shaft locking member 70 having a curved hook portion 72 attaching to the object 200 on the trailer 100, primarily the impeller shaft 210 of the personal water craft 200, a shaft 74 and an expanded stay 76 which prevents the vertical shaft locking member 70 from being pulled through the link 62 of the chain 60, the system 10 thus providing the hook shaped members 20, locking members 40 and padlocks 50 to lock the trailer wheels 120 to the leaf springs 110, the chain 60 to connect the hook shaped members 20 to each other, and the vertical shaft locking means 70 to lock the object 200 to the chain 60.

Figure 6:
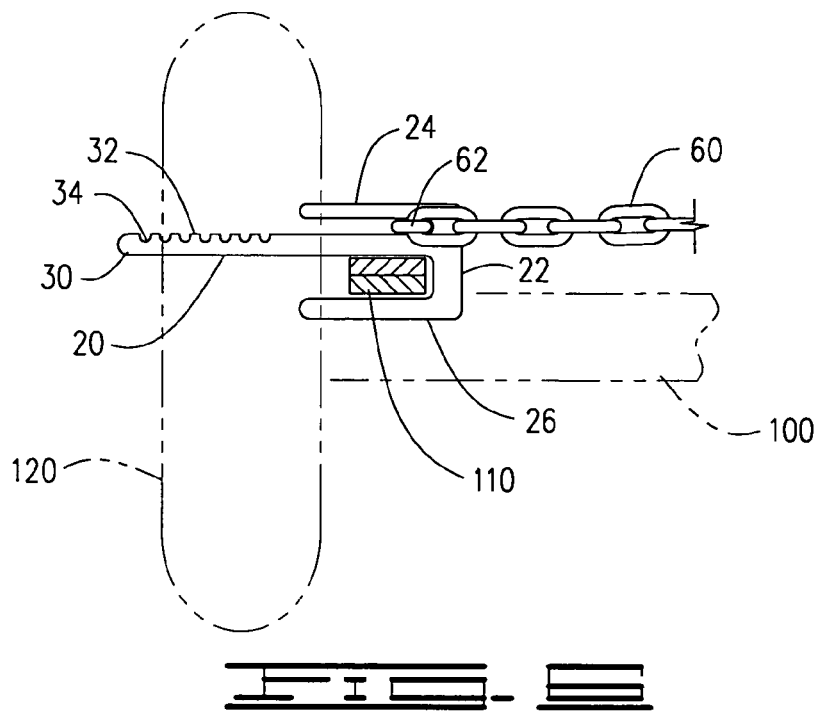
FIG. 6 is a view indicating the engagement of the hook shaped member with the chain and the leaf spring of the trailer.

More specifically, each hook shaped member 20, shown in FIGS. 1–2, has the lower hook 26 adapted to engage the leaf spring 110 of the trailer 100 and the upper hook 24 adapted to receive and secure the selected link 62 of the chain 60, FIGS. 3 and 6, while the locking end 30 protrudes through the slot 124 beyond the outer surface 122 of each respective wheel 120, with several of the spaced indentations 34 exposed, with the locking member 40 inserted upon the locking end 30, slid against the outer surface 122 of the wheel 120, placing the padlock 50 on the spaced indentation 34 closest to the locking member 40, FIG. 4, thus securing each wheel 120 to the respective leaf spring 110, preventing rotation and removal of the wheel 120.

Figure 5:
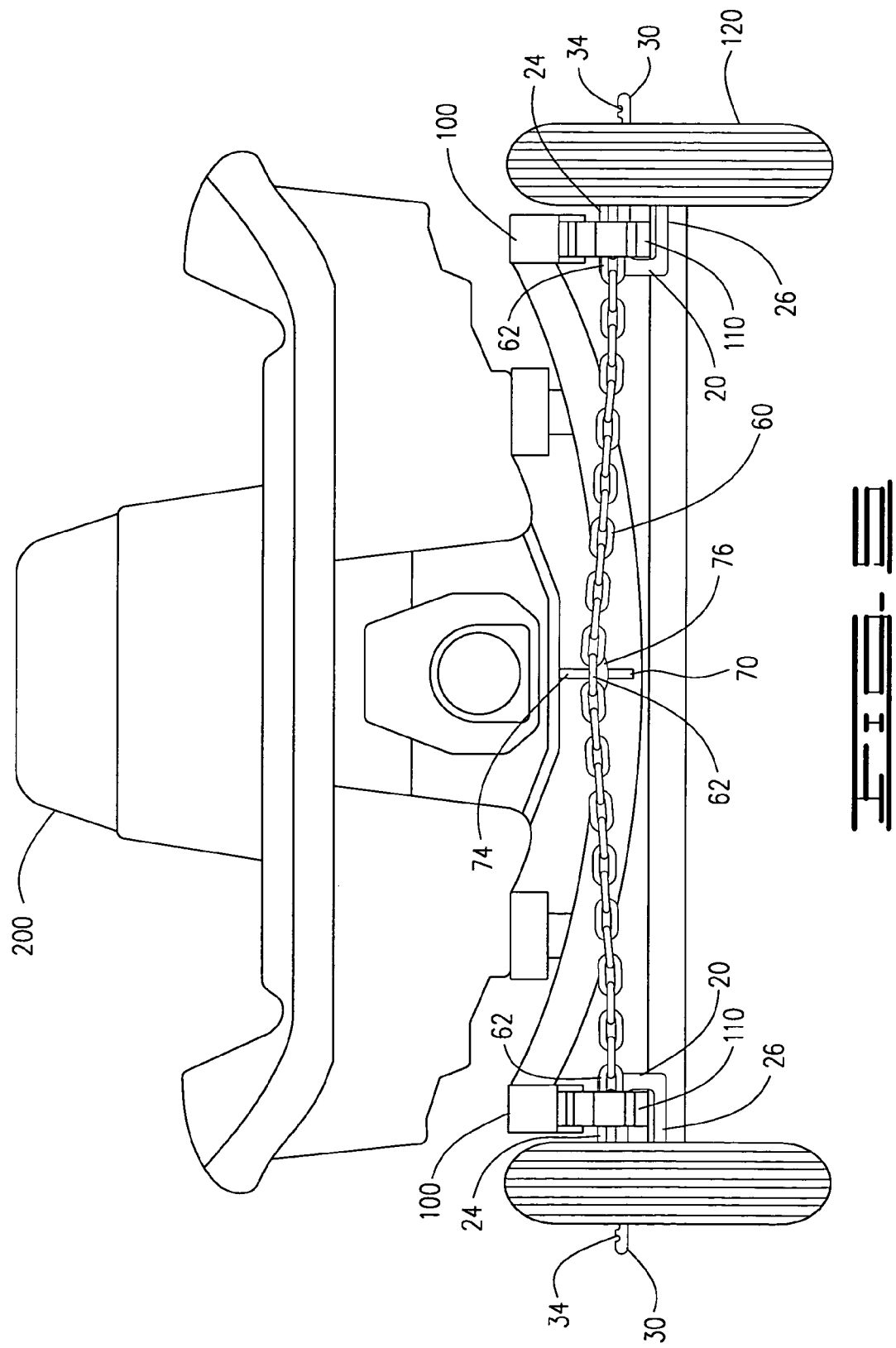
FIG. 5 is a rear view of the trailer and the personal water craft with the two hook shaped members engaged with the trailer wheels with the chain and vertical shaft locking member engaging an impeller shaft on the personal water craft, securing the personal water craft to the trailer.

The chain 60 may be provided as a singular length of chain, FIG. 5, or may be provided in two pieces, not shown. The chain 60 should be of a sufficient length the reach both hook shaped members 20, with some slack to allow for tightening and securing the object 200 on the trailer 100 so that the object 200 cannot be removed or raised above the trailer.

Figure 7:
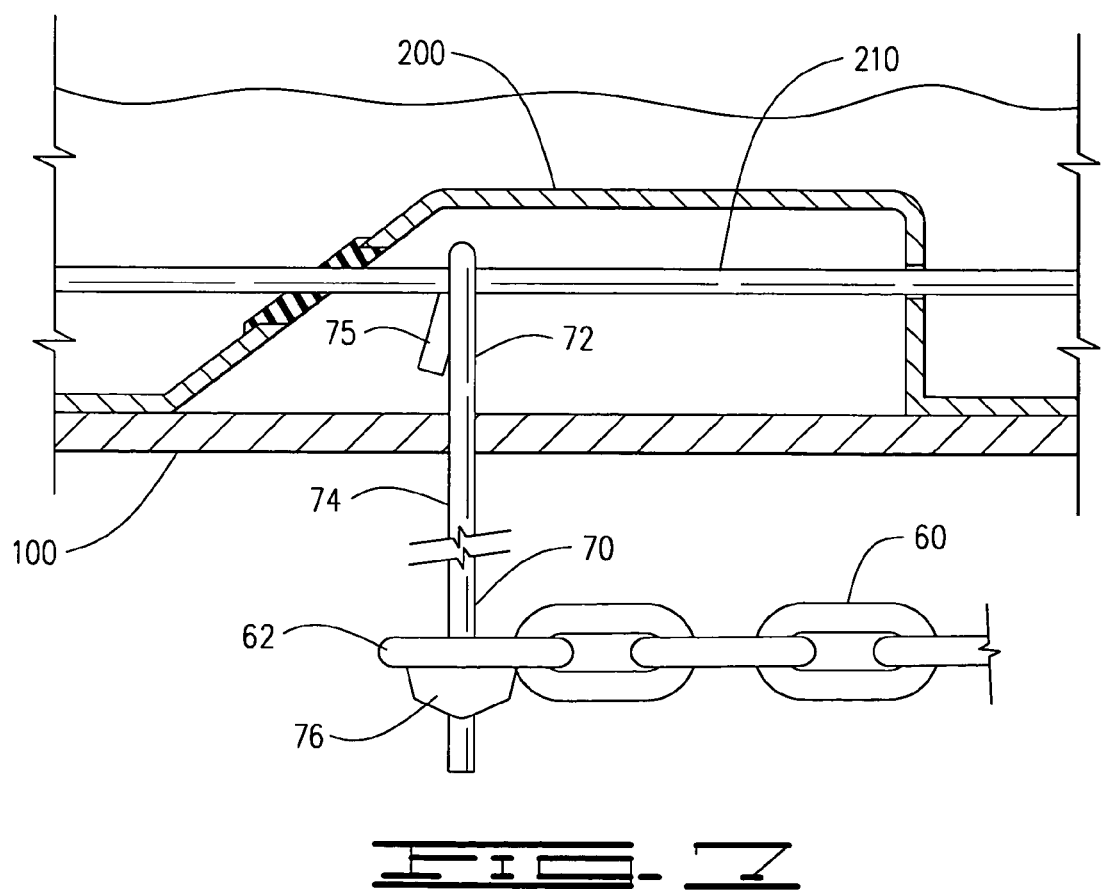
FIG. 7 is a side view portion of the vertical shaft locking member engaging the impeller shaft of the personal water craft and the chain.

The vertical shaft locking member 70 is further defined by the hook portion 72 having a slight outward curve 75, as indicated in FIGS. 7–9. This curve 75 allows for the hook portion 72 to be applied to the object 200, or in the case of FIG. 7, the impeller shaft 210 of the personal water craft 200, by placing the hook portion 72 adjacent to the impeller shaft 210 from the side and applying the hook portion 72 to the impeller shaft 210 by rotation of the vertical shaft locking member 70, and not having to raise the hook portion 72 directly above the impeller shaft 210 for application. The vertical shaft locking member 70 may be provided with a square shaft or, as indicated in FIGS. 8–9, with a rounded shaft. The expanded stay 76 may be welded to the shaft 74 or may be formed as part of the shaft 74, but in either case, should be applied so that it cannot be removed from the shaft 74 by force.

The trailer wheel lock system 10 may be use as disclosed in its entirety or it may be used with part of the components as given by the following combinations, although any application of the listed components may be used at the discretion of the user. For example, the hook shaped member 20, the locking member 40 and the padlock 50 may be used by themselves to secure a single trailer wheel 120 to the leaf spring 110, preventing rotation and removal of just that wheel 120. Both hook shaped members 20, both locking members 40 and both padlocks 50 may be used to secure both trailer wheels 120, thus preventing rotation and removal of two trailer wheels 120 at one time. This would be preferred when the user wants to use the object 200 on the trailer 100, yet secure the trailer 100 when parked.

The chain 60 may be used with the vertical shaft locking member 70 to secure the object 200 to the trailer 100 by itself, without securing the trailer wheels 120 during transport of the trailer 100, allowing the wheels 120 to rotate. In any case, the user has the discretion to determine what portions of the trailer 100 and the object 200 require securing by selecting the appropriate components for use.

While the system 10 has been particularly shown and described with reference to a preferred embodiment thereof, it will be understood by those skilled in the art that changes in form and detail may be made therein without departing from the spirit and scope of the invention.

What is claimed is:

1. A wheel lock system for a trailer having leaf springs and at least two wheels, upon which is carried an object, adapted to secure said trailer and said carried object, comprises:

a pair of hook shaped members, each hook shaped member having a hook end from which depend an upper hook and a lower hook, and a locking end defining an upper surface within which are a plurality of spaced indentations inserted through a slot of each respective trailer wheel;

a pair of padlocks secured within one of said plurality of spaced indentations in each hook shaped member;

locking members placed upon said locking ends of each hook shaped member between each respective padlock and an outer surface of each trailer wheel;

a chain having a plurality of links attached between said hook ends of each hook shaped member;

and a vertical shaft locking member inserted through a single link of said chain, said vertical shaft locking member having a curved hook portion attaching to said object on said trailer, a shaft and an expanded stay which prevents said vertical shaft locking member from being pulled through said chain, said system thus providing said hook shaped members and padlocks to lock said trailer wheels to said leaf springs, said chain to connect said pair of hook shaped members together, and said vertical shaft locking member to lock said object to said chain.

2. The system, as disclosed in claim 1, further comprising:
each hook shaped member, has said lower hook adapted to said leaf spring of said trailer and said upper hook adapted to receive and secure one of said plurality of links of said chain, while said locking end protrudes beyond said outer surface of each respective wheel, with several of said spaced indentations exposed beyond said outer surface of said wheel, said locking member inserted upon said locking end, slid against said outer surface of said wheel, securing said padlock within said indentation closest to said locking member, thus securing each wheel to said respective wheel, preventing rotation and removal of said wheel.

3. The system, as disclosed in claim 1, said vertical shaft locking member further comprising:
said hook portion has a slight outward curve, allowing for the hook portion to be applied to said object, by placing said hook portion adjacent to said object from said side and attaching said hook portion to said object by rotation of said vertical shaft locking member; and
said expanded stay is connected to said shaft wherein it cannot be removed from said shaft by force.

4. The system, as disclosed in claim 1, further comprising:
each hook shaped member, has said lower hook adapted to said leaf spring of said trailer and said upper hook adapted to receive and secure one of said plurality of links of said chain, while said locking end protrudes beyond said outer surface of each respective wheel, with several of said spaced indentations exposed beyond said outer surface of said wheel, said locking member inserted upon said locking end, slid against said outer surface of said wheel, securing said padlock within said indentation closest to said locking member, thus securing each wheel to said respective wheel, preventing rotation and removal of said wheel; and
said hook portion of said vertical shaft locking member has a slight outward curve, allowing for the hook portion to be applied to said object, by placing said hook portion adjacent to said object from said side and attaching said hook portion to said object by rotation of said vertical shaft locking member, and said expanded stay is connected to said shaft wherein it cannot be removed from said shaft by force.

5. A wheel lock system for a trailer having leaf springs and at least two wheels, upon which is carried a personal water craft having an impeller shaft, adapted to lock and secure said trailer and said carried personal water craft, comprises:
a pair of hook shaped members, each hook shaped member having a hook end from which depend an upper hook and a lower hook, and a locking end defining an upper surface within which are a plurality of spaced indentations inserted through a slot of each respective trailer wheel;
a pair of padlocks secured within one of said plurality of spaced indentations in each hook shaped member;
locking members placed along said locking ends of each hook shaped member between each respective padlock and an outer surface of each trailer wheel;
a chain having a plurality of links attached between said hook ends of each hook shaped member;
and a vertical shaft locking member inserted through a single link of said chain, said vertical shaft locking member having a curved hook portion attaching to said impeller shaft of said personal water craft on said trailer, a shaft and an expanded stay which prevents said vertical shaft locking member from being pulled through said chain, said system thus providing said hook shaped members and padlocks to lock said trailer wheels to said leaf springs, said chain to connect said pair of hook shaped members together, and said vertical shaft locking means to lock said personal water craft to said chain.

6. The system, as disclosed in claim 5, further comprising:
each hook shaped member, has said lower hook adapted to said leaf spring of said trailer and said upper hook adapted to receive and secure one of said plurality of links of said chain, while said locking end protrudes beyond said outer surface of each respective wheel, with several of said spaced indentations exposed beyond said outer surface of said wheel, said locking member inserted upon said locking end, slid against said outer surface of said wheel, securing said padlock within said indentation closest to said locking member, thus securing each wheel to said respective wheel, preventing rotation and removal of said wheel.

7. The system, as disclosed in claim 5, said vertical shaft locking member further comprising:
said hook portion has a slight outward curve, allowing for the hook portion to be applied to said impeller shaft of said personal water craft, by placing said hook portion adjacent to said impeller shaft from said side and attaching said hook portion to said impeller shaft by rotation of said vertical shaft locking member; and
said expanded stay is connected to said shaft wherein it cannot be removed from said shaft by force.

8. The system, as disclosed in claim 5, further comprising:
each hook shaped member, has said lower hook adapted to said leaf spring of said trailer and said upper hook adapted to receive and secure one of said plurality of links of said chain, while said locking end protrudes beyond said outer surface of each respective wheel, with several of said spaced indentations exposed beyond said outer surface of said wheel, said locking member inserted upon said locking end, slid against said outer surface of said wheel, securing said padlock within said indentation closest to said locking member, thus securing each wheel to said respective wheel, preventing rotation and removal of said wheel; and
said hook portion of said vertical shaft locking member has a slight outward curve, allowing for the hook portion to be applied to said impeller shaft of said personal water craft, by placing said hook portion adjacent to said impeller shaft from said side and attaching said hook portion to said impeller shaft by rotation of said vertical shaft locking member, and said expanded stay is connected to said shaft wherein it cannot be removed from said shaft by force.

* * * * *